US012263602B1

(12) United States Patent
Yang et al.

(10) Patent No.: US 12,263,602 B1
(45) Date of Patent: Apr. 1, 2025

(54) ROBOT CALIBRATION METHOD BASED ON POSE CONSTRAINT AND FORCE SENSING

(71) Applicant: NINGBO INSTITUTE OF MATERIALS TECHNOLOGY AND ENGINEERING, CHINESE ACADEMY OF SCIENCES, Ningbo (CN)

(72) Inventors: Guilin Yang, Ningbo (CN); Jianhui He, Ningbo (CN); Silu Chen, Ningbo (CN); Hongyu Wan, Ningbo (CN); Jingbo Luo, Ningbo (CN); Ye Tang, Ningbo (CN); Zhihui Zhang, Ningbo (CN); Qingying Chen, Ningbo (CN); Chi Zhang, Ningbo (CN)

(73) Assignee: NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 0 days.

(21) Appl. No.: 18/841,699

(22) PCT Filed: Jun. 20, 2023

(86) PCT No.: PCT/CN2023/101305
§ 371 (c)(1),
(2) Date: Aug. 27, 2024

(87) PCT Pub. No.: WO2024/037174
PCT Pub. Date: Feb. 22, 2024

(30) Foreign Application Priority Data

Aug. 15, 2022 (CN) .......................... 202210984472.X (51) Int. Cl.
*B25J 9/00* (2006.01)
*B25J 9/16* (2006.01)
*B25J 13/08* (2006.01)

(52) U.S. Cl.
CPC ........... *B25J 9/1692* (2013.01); *B25J 9/0081* (2013.01); *B25J 13/085* (2013.01)

(58) Field of Classification Search
CPC ....... B25J 9/1692; B25J 9/0081; B25J 13/085
See application file for complete search history.

(56) References Cited

U.S. PATENT DOCUMENTS

| 2011/0046782 | A1* | 2/2011 | Fixell ................. G05B 19/4015 |
| | | | 700/251 |
| 2020/0298403 | A1 | 9/2020 | Nilsson et al. |
| 2021/0039259 | A1* | 2/2021 | Duprez ............... G01B 21/042 |

FOREIGN PATENT DOCUMENTS

| CN | 107042528 A | 8/2017 |
| CN | 112847341 A | 5/2021 |

(Continued)

OTHER PUBLICATIONS

Qi Fei, et al., A Robot's Parameter Identification Method with Joint Flexible Errors taken into Account, Mechanical Science and Technology for Aerospace Engineering, 2017, pp. 512-518, vol. 36 No.4.

*Primary Examiner* — Adam R Mott
*Assistant Examiner* — Heather J Keniry
(74) *Attorney, Agent, or Firm* — Bayramoglu Law Offices LLC (57) ABSTRACT

A robot calibration method based on pose constraint and force sensing includes the following steps: establishing a kinematic model, a geometric error model, and a non-geometric error model; installing an end calibration device to an end of a robot, and installing to the geometric constraint device into a working space of the robot; dragging the robot, constraining various calibration spheres of the end (Continued)

calibration device into various V-shaped grooves on the geometric constraint device to achieve pose constraint; then dragging the calibration spheres to V-shaped grooves on different surfaces, and calibrating a geometric parameter error of the robot using a deviation between a nominal end pose measured twice and an actual value; reading an end force by a force sensor to calibrate the non-geometric error model; identifying kinematic model parameters of a corresponding robot; and compensating an identified kinematic model parameter error to a controller of the robot.

10 Claims, 5 Drawing Sheets

(56) References Cited

FOREIGN PATENT DOCUMENTS

| | | | |
|---|---|---|---|
| CN | 112873199 | A | 6/2021 |
| CN | 112959354 | A | 6/2021 |
| CN | 113400088 | A | 9/2021 |
| CN | 113927599 | A | 1/2022 |
| CN | 114147726 | A | 3/2022 |
| CN | 115319727 | A | 11/2022 |
| WO | 2022007753 | A1 | 1/2022 |

* cited by examiner

ROBOT CALIBRATION METHOD BASED ON POSE CONSTRAINT AND FORCE SENSING

CROSS REFERENCE TO THE RELATED APPLICATIONS

This application is the national phase entry of International Application No. PCT/CN2023/101305, filed on Jun. 20, 2023, which is based upon and claims priority to Chinese Patent Application No. 202210984472.X, filed on Aug. 15, 2022, the entire contents of which are incorporated herein by reference.

TECHNICAL FIELD

The present disclosure belongs to the technical field of robot calibration, and in particular to a robot calibration method based on pose constraint and force sensing.

BACKGROUND

Collaborative robot is a novel industrial robot capable of cooperating with people at close range. Compared with the traditional industrial robot, the collaborative robot has the advantages of light weight, good compliance, good safety, draggable teaching, easy deployment and implementation, and capability of supporting man-machine cooperation, which not only can meet the growing demands of small batch and multi-variety production in manufacturing industry, but also can be applied in the field of social services to achieve safe and friendly man-machine interaction, thus having a very broad development prospect.

However, the absolute positioning accuracy of the collaborative robot is poor because of some errors in parts machining and assembly of the collaborative robot. Therefore, in order to improve the absolute positioning accuracy of the cooperative robot, the robot often needs to be calibrated.

For robot calibration, scholars in China and abroad have carried out fruitful research work, and established a robot kinematics calibration method consisting of four main steps: error modeling, pose measurement, parameter identification and error compensation, which effectively improves the absolute positioning accuracy of the industrial robot. However, most of the existing robot kinematic calibration methods need to rely on external precision measuring equipment, such as a laser tracker, an arm type coordinate measuring machine and a draw-wire measuring system, to measure the position or pose of the robot. However, these sets of large-scale precision measuring equipment have some problems, such as high price, high use and maintenance cost, poor convenience and difficulty in field deployment and implementation, which are difficult to meet the regular field calibration needs of the cooperative robot.

For the problems above, in recent years, numerous researchers have begun to explore low-cost, portable self-calibration devices. In Patent CN107042528A, a calibration device for an industrial robot is provided. Three probing ball-bars fixed to the end of the robot are in contact with a target sphere fixed to a desktop, the readings of three displacement sensors are read, the same or different spheres are touched twice, and the robot is calibrated using a deviation between a nominal distance and an actual value. However, the end error information capable of being reflected by the above calibration device and method based on position, distance and plane constraints is limited, and less error information can be reflected by a single measurement. In addition, these calibration devices can only calibrate and compensate geometric errors than non-geometric errors.

How to provide a calibration scheme capable of providing full-pose error information and estimating and compensating for non-geometric errors is an urgent problem to be solved.

SUMMARY

A main objective of the present disclosure is to provide a robot calibration method based on position and distance constraints, which can provide all-pose error information and can estimate and compensate for non-geometric errors, thus overcoming the shortcomings in the prior art.

In order to achieve the objective of the present disclosure, the technical solution adopted the present disclosure is as follows: a robot calibration method based on pose constraint and force sensing is provided, which is achieved based on a robot calibration device. The robot calibration device includes an end calibration device, and a geometric constraint device. The end calibration device includes a force sensor, a connecting seat, and multiple calibration spheres. The connecting seat is connected to the force sensor. The calibration spheres are fixed to one end face of the connecting seat. The geometric constraint device includes a constraint supporting seat, and multiple V-shaped grooves which are arranged on the constraint supporting seat and correspond to the number of the calibration spheres. The method includes the following steps:

S1: establishing a model, where the model includes a kinematic model of a robot, a geometric error model based on pose constraint, and a non-geometric error model;

S2: measuring and installing, including measuring a first relative pose of each calibration sphere on the end calibration device relative to the connecting seat, and a second relative pose between the V-shaped grooves on the geometric constraint device, installing the end calibration device to the end of the robot after measuring, and installing the geometric constraint device into a working space of the robot;

S3: collecting data, including changing a position of the geometric constraint device in the working space of the robot by many times, dragging the robot at each position to make various calibration spheres of the end calibration device correspondingly constrained in the V-shaped grooves on the geometric constraint device, changing a magnitude and direction of a force exerted on the end of the end calibration device for many times, enabling various calibration spheres to touch the V-shaped grooves in different faces on the geometric constraint device in the same way, and reading and recording joint angle data and force sensor data after each measurement operation is stable;

S4: identifying parameters, including dividing the joint angle data and the force sensor data into a plurality of groups according to different geometric constraint device poses, and then dividing the plurality of groups of data into a plurality of sub-groups according to different faces where the V-shaped grooves are located, and substituting data with the smallest indication of the force sensors in the same group but different sub-groups into the geometric error model in pairwise; substituting the same group of data into the non-geometric error model, training the data by machine learning, and then adding an identified non-geometric error model to the kinematic model after geometric parameter identification to identify parameters of the kinematic model of the corresponding robot; and S5: compensating error, including compensating an identified parameter error of the kinematic model to a controller of the robot.

In a preferred embodiment, in S1, the kinematic model is constructed by establishing a corresponding relationship among an end pose, a joint angle, joint screw and initial pose of the robot through global exponential product formula. The geometric error model is constructed by establishing a corresponding relationship among a pose constraint error, a joint screw error and an initial pose error through a companion transformation matrix. The non-geometric error model is constructed by establishing a corresponding relationship among the end pose, the joint angle and an end contact force of the robot through the companion transformation matrix.

In a preferred embodiment, the global exponential product formula is expressed as follows:

$$T_{0,n+1} = e^{\hat{s}_1 q_1} e^{\hat{s}_1 q_1} \ldots e^{\hat{s}_n q_n} T_{0,n+1}(0);$$

where $T_{0,n+1}$ denotes coordinates of the end pose of the robot under a base coordinate system, $s_i(i=1, 2, \ldots, n)$ denotes coordinates of the joint screw of the robot under the base coordinate system, $q_i(i=1, 2, \ldots, n)$ denotes a rotating angle of each joint of the robot, i.e., a joint angle, and $T_{0,n+1}(0)$ denotes an initial pose of the end of the robot relative to the base coordinate system.

In a preferred embodiment, the geometric error model is expressed as follows:

$$Y_{TC} = A_{TC} X;$$

where $Y_{TC} = \log{(T_{12}{}^a T_{12}{}^{n-1})} \in \mathfrak{R}^{6 \times 1}$ denotes a deviation between a nominal end pose and an actual value under two different configurations, X denotes a model parameter error to be identified, $A_{TC}$ denotes a pose constraint relationship matrix between an end pose error and a model parameter error, and the $A_{TC}$ is expressed as follows:

$$A_{TC} = Ad(T_{0,n+1})^{-1}(A_2 - A_1) \in \mathfrak{R}^{6 \times 6(n+1)}.$$

where Ad(•) denotes a companion transformation matrix corresponding to a one-homogeneous transformation matrix, and $A_j(i=1,2)$ is expressed as follows:

$$A_j = [I_6 - Ad(e^{\hat{s}_1 q_1,j}), Ad(T_{0,1})(I_6 - Ad(e^{\hat{s}_2 q_2,j})), \ldots,$$
$$Ad(T_{0,n})(I_6 - Ad(e^{\hat{s}_n q_n,j})), Ad(T_{0,n+1})] \in \mathfrak{R}^{6 \times 6(n+1)}.$$

In a preferred embodiment, the non-geometric error model is expressed as follows:

$$T_{0,n+1} = T\varepsilon(q,F)T_c(q);$$

where $T_c(q)$ denotes a kinematic model after the geometric error is calibrated, which satisfies the following constraints conditions in the pose constraint:

$$T\varepsilon(q_1, F_1)T_c(q_1)[T_\varepsilon(q_2, F_2)T_c(q_2)]^{-1} = T_{12}{}^a,$$

where $T_{12}{}^a = T_1{}^a T_2{}^{a^{-1}}$ denotes a difference between two actual end poses.

In a preferred embodiment, m pairwise constraint samples are synthesized and expressed as the following error model:

$$Y = AX;$$
$$Y = [Y_{TC}^1, Y_{TC}^2; \ldots; Y_{TC}^m] \in R^{6m \times 1} \quad ;$$
$$A = [A_{TC}^1; A_{TC}^2; \ldots; A_{TC}^m] \in R^{6m \times 6(n+1)}$$

where Y is a vector formed by combining m end pose errors, A denotes a combined relationship matrix formed by m end pose constraint relationship matrices, and m is an integer greater than or equal to 1.

In a preferred embodiment, in S4, the parameter error of the kinematic model is identified by adopting the least square method iteration, and the least square formula is expressed as follows:

$$X = (A^T A)^{-1} A^T Y.$$

In a preferred embodiment, in S5, the identified parameter error of the kinematic model is compensated to the controller of the robot in a direct compensation or indirect compensation mode.

In a preferred embodiment, the direct compensation mode includes directly modifying parameters of the kinematic model in the controller.

In a preferred embodiment, the indirect compensation mode includes correcting a target pose through the identified parameters of the kinematic model, inputting the corrected target pose into an original controller, and performing error compensation on the original kinematic model.

Compared with the prior art, the present disclosure has beneficial effects as follows:

During calibration, by dragging a robot, three calibration spheres on an end calibration device are adsorbed into three V-shaped grooves on a geometric constraint device by magnets, thus achieving pose constraint. Then the calibration spheres are dragged to the V-shaped grooves on different surfaces, and the geometric parameter error of the robot is calibrated by using a deviation between the nominal end pose measured twice and the actual value. In addition, a non-geometric error model can be identified by reading an end force through a force sensor. Meanwhile, the introduction of the force sensor can help the traditional industrial robot to achieve the function of dragging teaching, and then broaden the application scope of the present disclosure. Compared with the traditional external calibration device, the present disclosure has the advantages of low cost and good portability. Compared with most self-calibration devices, the end pose error information provided by the present disclosure is more, and can also be used to identify the non-geometric error model.

BRIEF DESCRIPTION OF THE DRAWINGS

To describe the technical solutions of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

In the drawings.

1—robot; 2—connecting flange; 3—force sensor; 4—connecting seat; 5—calibration sphere; 6—V-shaped groove; 7—constraint supporting seat.

DETAILED DESCRIPTION OF THE EMBODIMENTS

The present disclosure will be more completely understood by reading the following detailed description in conjunction with the accompanying drawings. Detailed embodiments of the present disclosure are disclosed herein. However, it should be understood that the disclosed embodiments are only exemplary of the present disclosure, which can be embodied in various forms. Therefore, specific functional details disclosed herein should not be construed as limiting, but merely as the basis of the claims and as a representative basis for teaching those skilled in the art to variously employ the present disclosure in virtually any suitable detailed embodiment.

A robot calibration method based on pose constraint and force sensing disclosed by the present disclosure is achieved on the basis of a robot calibration device. For the problems that the existing calibration device is limited in end error information response, and incapable of performing non-geometric error calibration, by using the characteristic that the cooperative robot can perform drag teaching, the pose constraint and the geometric and non-geometric parameter error marking of the robot are achieved. For general industrial robots, the present disclosure can also be applied if the function of drag teaching can be achieved.

Figure 1:
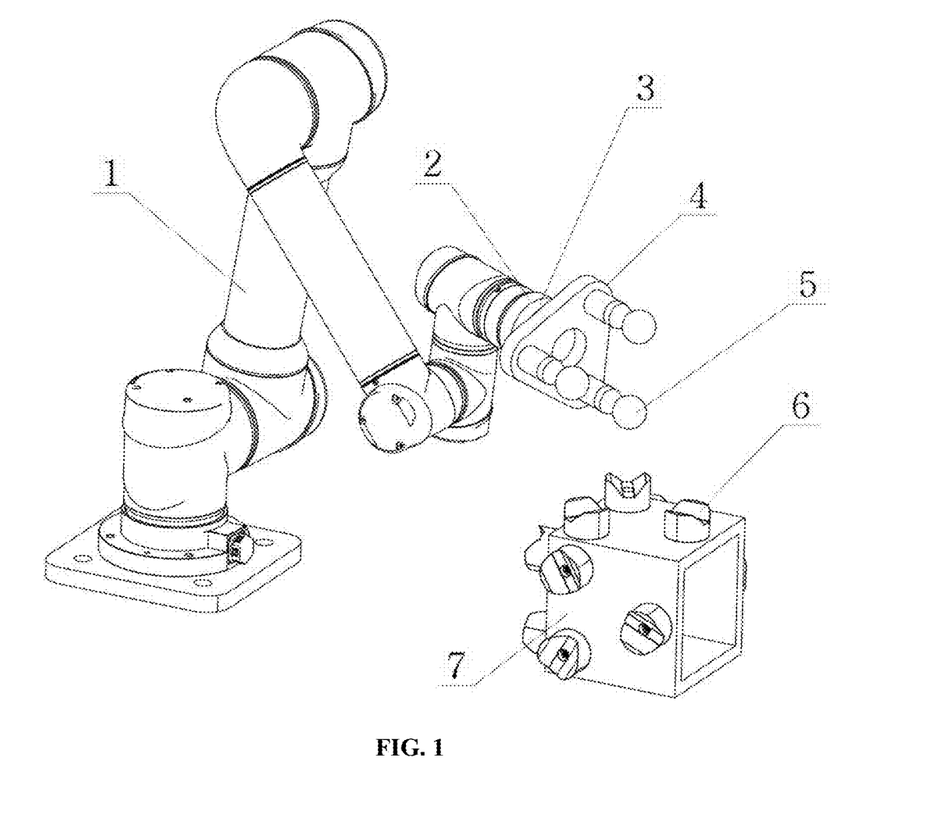
FIG. 1 is a structural diagram of a device according to an embodiment of the present disclosure.
Figure 3:
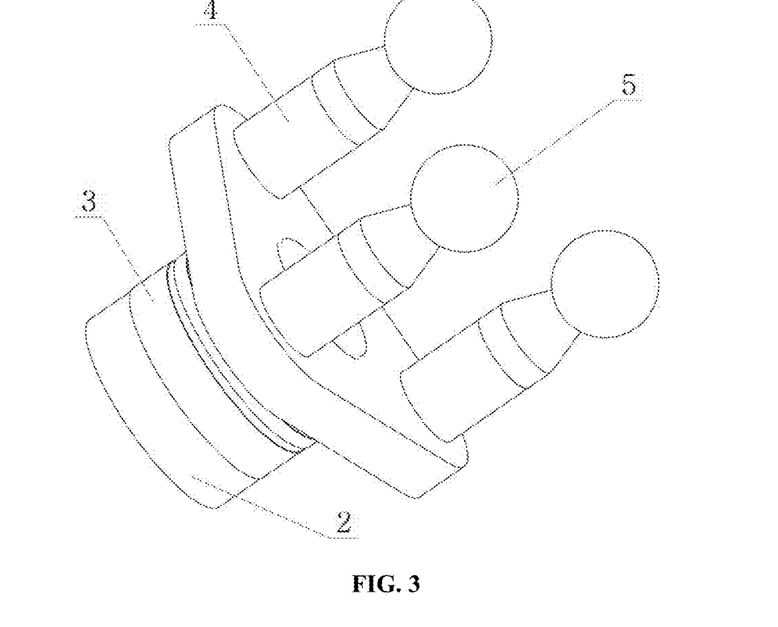
FIG. 3 is a structural diagram of an end calibration device according to the present disclosure.
Figure 4:
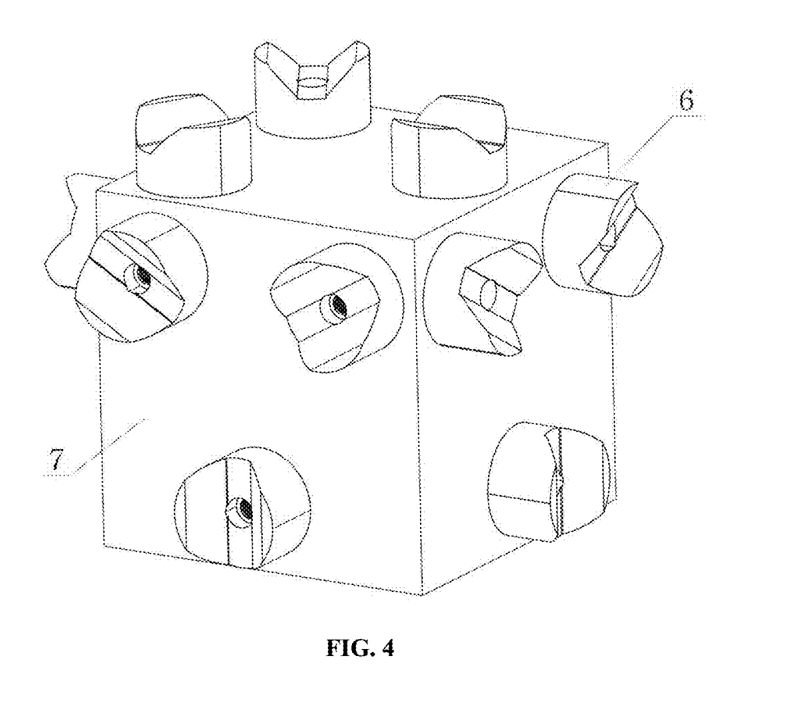
FIG. 4 is a structural diagram of a geometric constraint device according to the present disclosure.

As shown in FIG. 1, a robot calibration device includes an end calibration device, and a geometric constraint device. In conjunction with FIG. 3, the end calibration device is installed at an end of the robot 1, specifically including a connecting flange 2, a force sensor 3, a connecting seat 4, and multiple calibration spheres 5 installed on one end of the connecting seat 4. In conjunction with FIG. 3, the geometric constraint device is installed in a working space of the robot 1, mainly including a constraint supporting seat 7, and multiple V-shaped grooves 6 arranged on the constraint supporting seat 7. In this embodiment, there are three calibration spheres 5, and three corresponding V-shaped grooves 6.

The robot calibration device provided by the present disclosure can be used to calibrate a geometric error of the robot based on pose constraint: through the method of drag teaching, during calibration, the end calibration device is installed at the end of the robot 1, specifically, the connecting seat 4 is installed at the end of the robot 1 by the connecting flange 2. The geometric constraint device is installed in the working space of the robot 1. By dragging the robot 1, the calibration spheres 5 on the end calibration device are adsorbed to the V-shaped grooves 6 on the geometric constraint device by magnets (not shown in the figure). For the pose constraint, during calibration, by dragging the robot 1, three calibration spheres 5 on the end calibration device are adsorbed to the three V-shaped grooves 6 on the geometric constraint device by the magnets, thus achieving the pose constraint of the end of the robot 1. For the calibration of the geometric parameter error of the robot, the three calibration spheres 5 on the end calibration device are constrained to the V-shaped grooves 6 in the other surface of the geometric constraint device in the similar way, and a geometric parameter error of the robot is calibrated using deviations between twice nominal end poses and the actual values of the robot.

In addition, the device can also be used to calibrate the non-geometric error of the robot based on the pose constraint. Similarly, by using the method of drag teaching, the end of the robot 1 is brought close to the geometric constraint device, such that the three calibration spheres 5 on the end calibration device are lightly constrained to the three V-shaped grooves of the geometric constraint device at the same time, and then the end pose of the robot is kept unchanged, and the magnitude and direction of the force exerted on the end of the robot are changed for many times to cause the structural deformation of the robot, and the non-geometric error of the robot 1 is calibrated by using the corresponding force sensor 3 data and the joint angle data. The introduction of the force sensor 3 can help the traditional industrial robot to achieve the function of drag teaching, and then broaden the application scope of the present disclosure. Compared with the traditional external calibration device, the present disclosure has the advantages of low cost and good portability. Compared with most self-calibration devices, the end pose error information provided by the present disclosure is more, and can also be used to identify the non-geometric error model.

Figure 2:
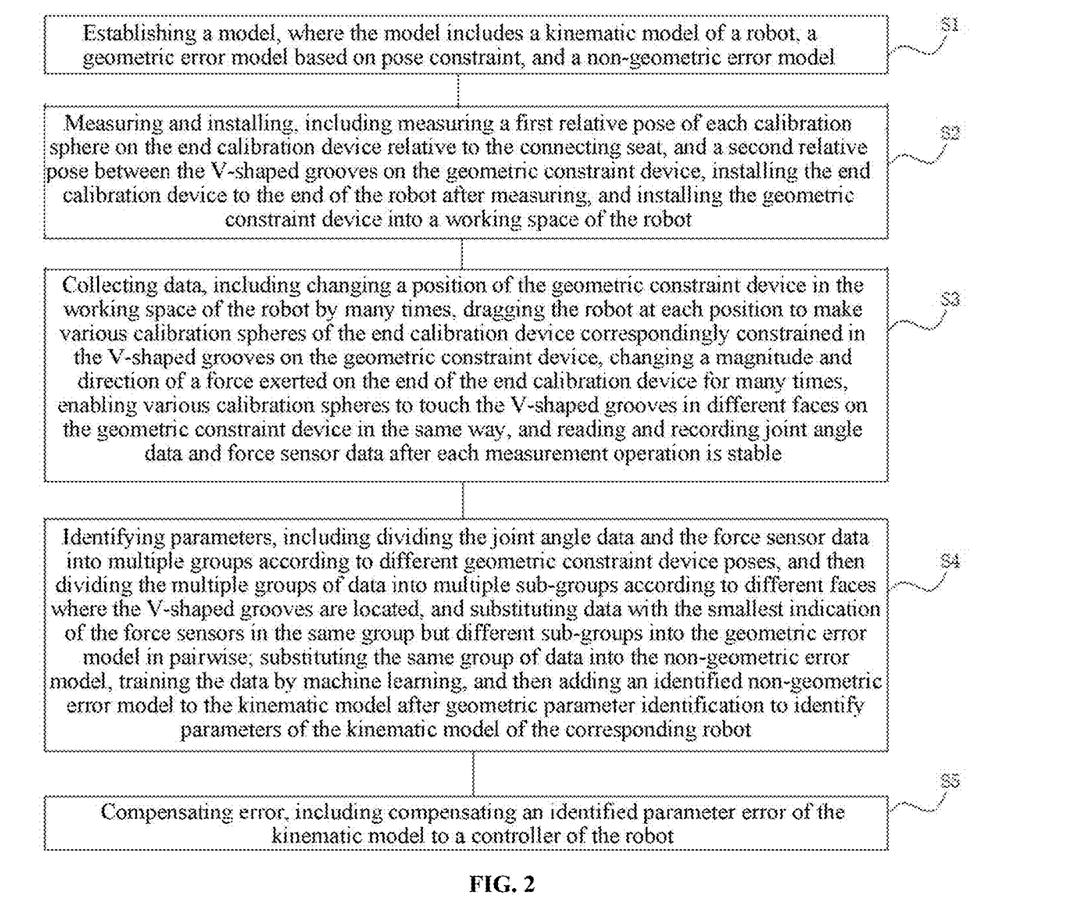
FIG. 2 is a flow diagram of a method in an embodiment of the present disclosure.

As shown in FIG. 2, a robot calibration method based on pose constraint and force sensing disclosed by the present disclosure specifically includes the following steps:

S1. Model establishment: the model includes a kinematic model of a robot, a geometric error model based on pose constraint, and a non-geometric error model.

Specifically, the robot is calibrated based on the pose constraint and the force sensing, respectively. In this embodiment, the kinematic model of the robot is established using the global exponential product formula. Specifically, the kinematic model is constructed by establishing a corresponding relationship among an end pose, a joint angle, joint screw, and initial pose of the robot through global exponential product formula. The global exponential product formula is expressed as follows:

$$T_{0,n+1} = e^{\hat{s}_1 q_1} e^{\hat{s}_1 q_1} \ldots e^{\hat{s}_n q_n} T_{0,n+1}(0);$$

where $T_{0,n+1}$ denotes coordinates of the end pose of the robot under a base coordinate system, $s_i (i=1, 2, \ldots, n)$ denotes coordinates of the joint screw of the robot under the base coordinate system, $q_i (i=1, 2, \ldots, n)$ denotes a rotating angle of each joint of the robot, i.e., a joint angle, and $T_{0,n+1}(0)$ denotes an initial pose of the end of the robot relative to the base coordinate system. The process of determining the base coordinates here mainly includes: an installation position of the robot relative to the geometric constraint device can be predicted (for example, it can be determined by measuring modes such as a three-dimensional scanner, a laser tracker, and a coordinate measuring machine). A position of the actual base coordinates can be calibrated again by the calibration device after the base coordinate system of the robot is calibrated by the calibration method provided by the present disclosure.

The geometric error model based on pose constraint is as follows: in the above kinematic model of the robot, $q_i (i=1, 2, \ldots, n)$ can be directly read by an encoder of the robot, while $s_i (i=1, 2, \ldots, n)$ and $T_{0,n+1}(0)$ need to perform parameter identification. $s_i (i=1, 2, \ldots, n)$ and $T_{0,n+1}(0)$ both can represent six parameter variables to be identified, so there is a total of $6(n+1)$ parameters to be identified. Errors $t_1, t_2, \ldots, t_n, t_0$ corresponding to these parameters are represented as a vector $X = [t_1, t_2, \ldots, t_n, t_0]^T \in \mathfrak{R}^{6(n+1)}$ to be identified. Through a certain formula derivation, a relationship between an end pose error and the parameter error of the kinematic model under two different configurations can be established, that is, the geometric error model is expressed as follows:

$$Y_{TC}=A_{TC}X;$$

where $Y_{TC}=\log (T_{12}{}^{a}T_{12}{}^{n-1})\in \mathfrak{R}^{6\times 1}$ denotes a deviation between a nominal end pose and an actual value under two different configurations, X denotes a model parameter error to be identified, $A_{TC}$ denotes a pose constraint relationship matrix between an end pose error and a model parameter error, and the $A_{TC}$ is expressed as follows:

$$A_{TC}=Ad(T_{0,n+1})^{-1}(A_2-A_1)\in \mathfrak{R}^{6\times 6(n+1)};$$

where Ad(•) denotes a companion transformation matrix corresponding to a one-homogeneous transformation matrix, and $A_j(i=1,2)$ is expressed as follows:

$$A_j=[I_6-Ad(e^{\S_1 q_{1,j}}),Ad(T_{0,1})(I_6-Ad(e^{\S_2 q_{2,j}})),\ldots,$$
$$Ad(T_{0,n})(I_6-Ad(e^{\S_n q_{n,j}})),Ad(T_{0,n+1})]\in \mathfrak{R}^{6\times 6(n+1)}.$$

Further, m pairwise constraint samples can be synthesized and expressed as the following error model:

$$Y = AX;$$
$$Y = [Y_{TC}^1, Y_{TC}^2; \ldots ; Y_{TC}^m] \in R^{6m\times 1} \quad;$$
$$A = [A_{TC}^1; A_{TC}^2; \ldots ; A_{TC}^m] \in R^{6m\times 6(n+1)}$$

where Y is a vector formed by combining m end pose errors, and A denotes a combined relationship matrix formed by m end pose constraint relationship matrices.

A non-geometric error model based on pose constraint is as follows: in this embodiment, a non-geometric error model based on the pose constraint may also be established. Due to the influence of self-weight and end force of the robot 1, joints and connecting rods will be deformed to some extent. An end pose calculated by the geometric error model is not consistent with an actual end pose, but there is a corresponding relationship among the deviation which is between the end pose and the actual end pose, a joint angle q and an end contact force f of the robot 1, which can be recorded as $T_e=f(q,F)$. By supplementing the deviation to the original geometric error model, the calculated end pose can be consistent with the actual end pose. The supplemented model can be expressed as follows:

$$T_{0,n+1}=T_e(q,F)T_c(q);$$

where $T_c(q)$ denotes a kinematic model after the geometric error is calibrated, which satisfies the following constraints conditions in the pose constraint:

$$T_e(q_1,F_1)T_c(q_1)[T_e(q_2,F_2)T_c(q_2)]^{-1}=T_{12}{}^a;$$

where $T_{12}{}^a=T_1{}^a T_2{}^{a-1}$ denotes a difference two actual end poses.

S2. Measuring and installing: a first relative pose between each calibration sphere 5 on the end calibration device and the connecting flange 2 and a second relative pose between the V-shaped grooves 6 on the geometric constraint device are measured, the end calibration device is installed to the end of the robot 1 after measuring, and the geometric constraint device is installed into a working space of the robot 1.

During implementation, a 3D scanner and other equipment can be used to measure the first relative pose and the second relative pose, and the first relative pose and the second relative pose are used as reference data for subsequent parameter identification.

S3. Data collection: a position of the geometric constraint device in the working space of the robot 1 is changed by many times, the robot is dragged at each position to make various calibration spheres 5 of the end calibration device correspondingly constrained in the V-shaped grooves 6 on the geometric constraint device, a magnitude and a direction of a force exerted on the end of the end calibration device is changed for many times, various calibration spheres 5 are enabled to touch the V-shaped grooves 6 in different faces on the geometric constraint device in the same way, and joint angle data and force sensor data are read and recorded after each measurement operation is stable.

Figure 5:
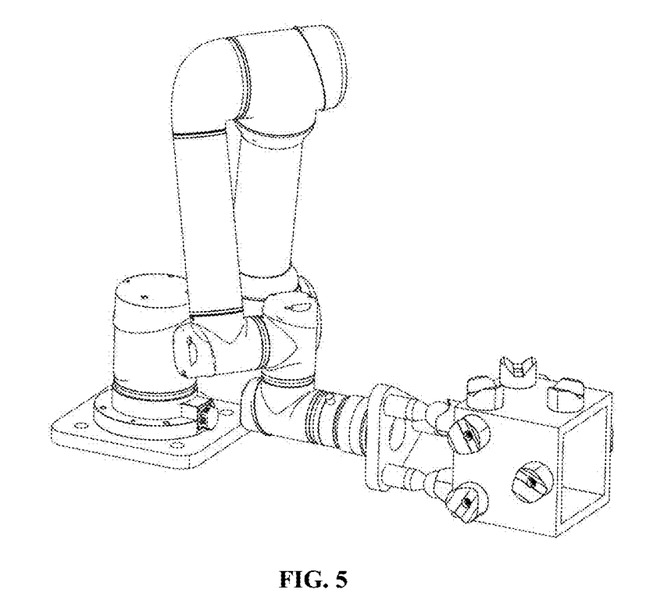
FIG. 5 is a schematic diagram of calibration spheres positioned in V-shaped grooves.
Figure 6:
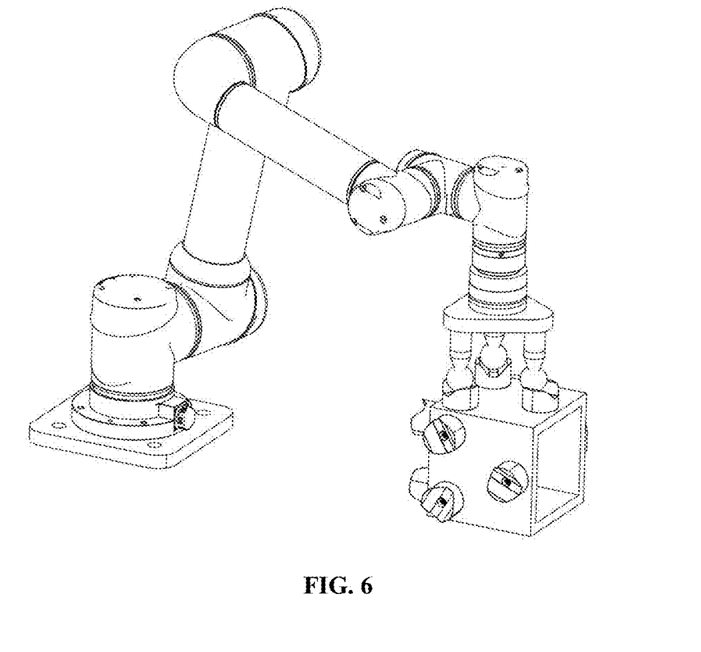
FIG. 6 is a schematic diagram of calibration spheres positioned in V-shaped grooves on different surfaces.

Specifically, in conjunction with FIG. 5 and FIG. 6, a process of collecting geometric error data based on pose constraint is specifically as follows: the robot 1 is dragged, three calibration spheres 5 on the end calibration device of the robot 1 are adsorbed into the V-shaped grooves on one surface of the geometric constraint device by magnets, and then are contained into the V-shaped grooves 6 on the other surface, the joint angle data and the force sensor data of the robot after each measurement operation is stable are read and recorded, thus collecting a group of geometric error data based on pose constraint. In order to reduce the influence of the measurement error and non-geometric error, the pose of the geometric constraint device in the working space of the robot can be changed many times, thus collecting multiple groups of data.

Figure 7:
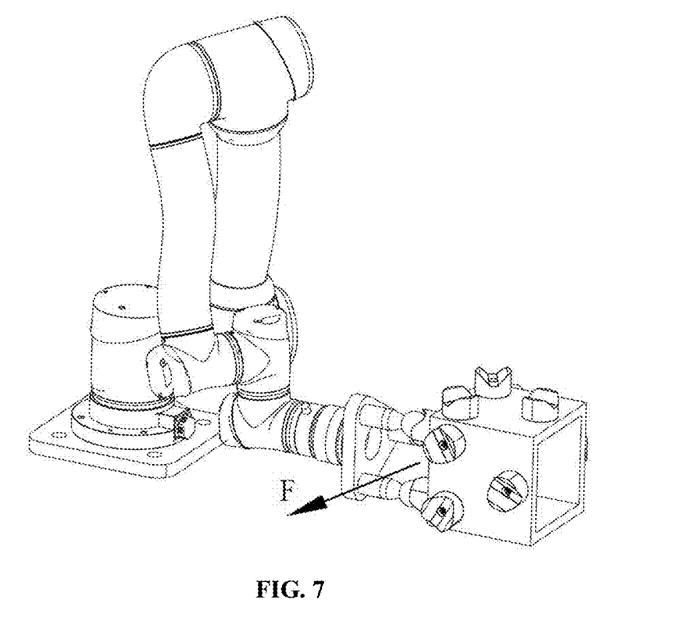
FIG. 7 is a schematic diagram of structural deformation of a robot in a case that an end is stressed.

In conjunction with FIG. 5 to FIG. 7, a process of collecting non-geometric error data based on pose constraint is specifically as follows: the robot 1 is dragged, the three calibration spheres 5 on the end calibration device of the robot 1 are adsorbed into the V-shaped grooves on one surface of the geometric constraint device by magnets, the joint angle data and the force sensor 3 data of the robot after each measurement operation is stable are read and recorded, thus collecting a group of geometric error data based on pose constraint. Similarly, in order to reduce the influence of the measurement error and the non-geometric error, the pose of the geometric constraint device in the working space of the robot can be changed many times, thus collecting multiple groups of data.

S4. Parameter identification: the joint angle data and the force sensor data are divided into multiple groups according to different geometric constraint devices, and then the multiple groups of data are divided into several sub-groups according to different faces where the V-shaped grooves are located, and the data with the smallest indication of the force sensors in the same group but different sub-groups can be substituted into the geometric error model in pairwise. The same group of data is substituted into the non-geometric error model, the data is trained by machine learning, and then an identified non-geometric error model is supplemented to the kinematic model after geometric parameter identification to identify parameters of the kinematic model of the corresponding robot.

Specifically, in this embodiment, the parameter error of the kinematic model is identified by adopting the least square method iteration. The least square formula is expressed as follows:

$$X=(A^TA)^{-1}A^TY.$$

The parameters of the kinematic model are corrected using the model parameter error obtained in each step of calculation, and then the corrected parameters are substituted into the kinematic model for calculation again, and so on, until the parameters of the kinematic model no longer change, and the iteration is stopped.

For the non-geometric error, the non-geometric error model can be identified by machine learning such as neural network, such that the non-geometric error data in pairs can meet the corresponding pose constraints.

The identified non-geometric error model is supplemented to the kinematic model identified by geometric parameters, and a final kinematic model can be obtained.

S5. Error compensation: an identified parameter error of the kinematic model is compensated to the controller of the robot.

Specifically, the identified parameter errors of the kinematic model are compensated to the controller, generally, there are two ways of compensation: direct compensation, and indirect compensation. Direct compensation is to directly modify the parameters of the kinematic model in the controller, while indirect compensation is to correct a target pose through the calibrated parameters of the kinematic model, and to input the corrected target pose into an original controller, thus compensating the errors of the original kinematic model.

Compared with the traditional external robot calibration scheme, a calibration device capable of providing full-pose error information and estimating and compensating the non-geometric error is provided, which has the characteristics of low cost and good portability. Compared with most existing self-calibration devices, there is no additional sensor in the present disclosure, and the present disclosure has the advantages of simple operation, difficult damage, and the like.

Various aspects, embodiments, features and examples of the present disclosure are to be considered as illustrative in all respects and are not intended to limit the present disclosure, the scope of which is defined only by the claims. Other embodiments, modifications and uses will be apparent to those skilled in the art without departing from the spirit and scope of the claimed present disclosure.

The use of titles and chapters in the present disclosure is not meant to limit the present disclosure. Each chapter can be applied to any aspect, embodiment, or feature of the present disclosure.

What is claimed is:

1. A robot calibration method based on pose constraint and force sensing, wherein the robot calibration method is achieved based on a robot calibration device, the robot calibration device comprises an end calibration device, and a geometric constraint device; the end calibration device comprises a force sensor, a connecting seat, and a plurality of calibration spheres; the connecting seat is connected to the force sensor; the calibration spheres are fixed to one end face of the connecting seat; the geometric constraint device comprises a constraint supporting seat, and a plurality of V-shaped grooves which are arranged on the constraint supporting seat and correspond to the number of calibration spheres;

wherein the robot calibration method comprises the following steps:

S1: establishing a model, wherein the model comprises a kinematic model of a robot, a geometric error model based on pose constraint, and a non-geometric error model;

S2: measuring and installing, comprising measuring a first relative pose of each calibration sphere on the end calibration device relative to the connecting seat, and a second relative pose between the V-shaped grooves on the geometric constraint device, installing the end calibration device to an end of the robot after measuring, and installing the geometric constraint device into a working space of the robot;

S3: collecting data, comprising changing a position of the geometric constraint device in the working space of the robot by many times, dragging the robot at each position to make various calibration spheres of the end calibration device correspondingly constrained in the V-shaped grooves on the geometric constraint device, changing a magnitude and direction of a force exerted on an end of the end calibration device for many times, enabling various calibration spheres to touch the V-shaped grooves in different faces on the geometric constraint device in a same way, and reading and recording joint angle data and force sensor data after each measurement operation is stable;

S4: identifying parameters, comprising dividing the joint angle data and the force sensor data into a plurality of groups according to different geometric constraint device poses, and then dividing the plurality of groups of data into a plurality of sub-groups according to different faces where the V-shaped grooves are located, and substituting data with the smallest indication of the force sensors in a same group but different sub-groups into the geometric error model in pairwise; substituting the same group of data into the non-geometric error model, training the data by machine learning, and then adding an identified non-geometric error model to the kinematic model after geometric parameter identification to identify parameters of the kinematic model of the corresponding robot; and S5: compensating error, comprising compensating an identified parameter error of the kinematic model to a controller of the robot.

2. The robot calibration method based on pose constraint and force sensing according to claim 1, wherein in S1, the kinematic model is constructed by establishing a corresponding relationship among an end pose, a joint angle, joint screw and initial pose of the robot through global exponential product formula; the geometric error model is constructed by establishing a corresponding relationship among a pose constraint error, a joint screw error and an initial pose error through a companion transformation matrix; and the non-geometric error model is constructed by establishing a corresponding relationship among the end pose, the joint angle and an end contact force of the robot through the companion transformation matrix.

3. The robot calibration method based on pose constraint and force sensing according to claim 2, wherein the global exponential product formula is expressed as follows:

$$T_{0,n+1} = e^{\hat{s}_1 q_1} e^{\hat{s}_1 q_1} \ldots e^{\hat{s}_n q_n} T_{0,n+1}(0);$$

wherein $T_{0,n+1}$ denotes coordinates of the end pose of the robot under a base coordinate system, $s_i (i=1, 2, \ldots, n)$ denotes coordinates of the joint screw of the robot under the base coordinate system, $q_i (i=1, 2, \ldots, n)$ denotes a rotating angle of each joint of the robot, i.e., a joint angle, and $T_{0,n+1}(0)$ denotes an initial pose of the end of the robot relative to the base coordinate system.

4. The robot calibration method based on pose constraint and force sensing according to claim 3, wherein the geometric error model is expressed as follows:

$$Y_{TC} = A_{TC} X;$$

wherein $Y_{TC} = \log(T_{12}{}^a T_{12}{}^{n-1}) \in \Re^{6 \times 1}$ denotes a deviation between a nominal end pose and an actual value under two different configurations, X denotes a model parameter error to be identified, $A_{TC}$ denotes a pose constraint relationship matrix between an end pose error and a model parameter error, and the $A_{TC}$ is expressed as follows:

$$A_{TC}=Ad(T_{0,n+1})^{-1}(A_2-A_1) \in \mathfrak{R}^{6 \times 6(n+1)};$$

wherein $Ad(\bullet)$ denotes a companion transformation matrix corresponding to a one-homogeneous transformation matrix, and $A_j(i=1,2)$ is expressed as follows:

$$A_j=[I_6-Ad(e^{\S_1 q_{1,j}}), Ad(T_{0,1})(I_6-Ad(e^{\S_2 q_{2,j}})), \ldots,$$
$$Ad(T_{0,n})(I_6-Ad(e^{\S_n q_{n,j}})), Ad(T_{0,n+1})] \in \mathfrak{R}^{6 \times 6(n+1)}.$$

5. The robot calibration method based on pose constraint and force sensing according to claim 4, wherein the non-geometric error model is expressed as follows:

$$T_{0,n+1}=T_\varepsilon(q,F)T_c(q)$$

wherein $T_c(q)$ denotes a kinematic model after the geometric error is calibrated, which satisfies the following constraints conditions in the pose constraint:

$$T_\varepsilon(q_1,F_1)T_c(q_1)[T_\varepsilon(q_2,F_2)T_c(q_2)]^{-1}=T_{12}{}^a;$$

wherein $T_{12}{}^a=T_1{}^a T_2{}^{a-1}$ denotes a difference between two actual end poses.

6. The robot calibration method based on pose constraint and force sensing according to claim 5, wherein m pairwise constraint samples are synthesized and expressed as the following error model:

$$Y = AX;$$
$$Y = \left[Y_{TC}^1, Y_{TC}^2; \ldots ; Y_{TC}^m\right] \in \mathfrak{R}^{6m \times 1} \quad ;$$
$$A = \left[A_{TC}^1; A_{TC}^2; \ldots ; A_{TC}^m\right] \in \mathfrak{R}^{6m \times 6(n+1)}$$

wherein Y is a vector formed by combining m end pose errors, A denotes a combined relationship matrix formed by m end pose constraint relationship matrices, and m is an integer greater than or equal to 1.

7. The robot calibration method based on pose constraint and force sensing according to claim 6, wherein in S4, the parameter error of the kinematic model is identified by adopting the least square method iteration, and the least square formula is expressed as follows:

$$X=(A^T A)^{-1} A^T Y.$$

8. The robot calibration method based on pose constraint and force sensing according to claim 1, wherein in S5, the identified parameter error of the kinematic model is compensated to the controller of the robot in a direct compensation or indirect compensation mode.

9. The robot calibration method based on pose constraint and force sensing according to claim 8, wherein the direct compensation mode comprises directly modifying parameters of the kinematic model in the controller.

10. The robot calibration method based on pose constraint and force sensing according to claim 8, wherein the indirect compensation mode comprises correcting a target pose through the identified parameters of the kinematic model, inputting the corrected target pose into an original controller, and performing error compensation on the original kinematic model.

\* \* \* \* \*